United States Patent [19]

Keller et al.

[11] Patent Number: 5,355,487
[45] Date of Patent: Oct. 11, 1994

[54] NON-INVASIVE TRACE-DRIVEN SYSTEM AND METHOD FOR COMPUTER SYSTEM PROFILING

[75] Inventors: Thomas W. Keller; Robert J. Urquhart, both of Austin, Tex.

[73] Assignee: International Business Machines Corporation, Armonk, N.Y.

[21] Appl. No.: 96,751

[22] Filed: Jul. 23, 1993

Related U.S. Application Data

[63] Continuation of Ser. No. 662,521, Feb. 28, 1991, abandoned.

[51] Int. Cl.$^5$ ............................................. G06F 11/34
[52] U.S. Cl. ..................................... 395/650; 395/700; 364/264; 364/264.4; 364/264.6
[58] Field of Search ................. 395/650, 700; 364/200, 364/900, 264, 264.4, 264.6

[56] References Cited

U.S. PATENT DOCUMENTS

| | | | |
|---|---|---|---|
| 4,845,615 | 7/1989 | Blasciak | 364/200 |
| 4,866,665 | 9/1989 | Haswell-Smith | 364/900 |
| 4,937,740 | 6/1990 | Agarwal et al. | 364/200 |
| 4,969,088 | 11/1990 | McAuliffe et al. | 395/325 |
| 5,047,919 | 9/1991 | Sterling et al. | 364/200 |

*Primary Examiner*—Kevin A. Kriess
*Assistant Examiner*—Matthew M. Payne
*Attorney, Agent, or Firm*—Robert M. Carwell

[57] ABSTRACT

The invention disclosed herein is a system and method for comprehensive, non-invasive profiling of a processor whereby feedback is provided to a programmer of the execution dynamics of a program. In a preferred embodiment a partial real-time reduction is provided of selected trace events employing the environment's trace facility, and a post-processing function is then performed. A trace hook is provided in the environment's periodic clock routine which captures the address to be returned to following this timer's interrupt, and further captures the address of the caller of the routine represented by the first address. The frequency of occurrences of the first address is collected and correlated to various virtual address spaces and corresponding subroutine offsets within those virtual address spaces. By employing the assembly and source code listing of programs, the address frequencies are then correlated back to specific instructions, and from information in the assembly listing accumulated time is further correlated against specific lines of source code. A profile is generated indicating the amount of time spent by the processor in various processes, kernel, shared library, and user spaces, and subroutines correlated to the lines of source code for negligible additional processor run time.

3 Claims, 5 Drawing Sheets

NON-INVASIVE TRACE-DRIVEN SYSTEM AND METHOD FOR COMPUTER SYSTEM PROFILING

This is a continuation of application Ser. No. 07/662,521 filed Feb. 28, 1991, now abandoned.

FIELD OF THE INVENTION

This invention relates to technology for profiling processor execution time in computer systems, and, more particularly, relates to systems and methods for trace-driven profiling.

BACKGROUND OF THE INVENTION

In order to improve performance of code generated by various families of computers, it is often necessary to determine where time is being spent by the processor in executing code, such efforts being commonly known in the computer processing arts as locating "hot spots". Ideally one would like to isolate such hot spots at the instruction and/or source line of code level in order to focus attention on areas which might benefit most from improvements to the code.

For example, isolating such hot spots to the instruction level permits compiler writers to find significant areas of suboptimal code generation, whereby they may thus focus their efforts to improve code generation efficiency in these areas. Another potential important use of instruction level detail is to provide guidance to the designer of future systems. Such designers with appropriate profiling tools may find characteristic code sequences and/or single instructions requiring improvement to optimize the available hardware for a given level of hardware technology.

In like manner, isolating hot spots to the source line of code level would provide the level of detail necessary for an application developer to make algorithmic tradeoffs. A programmer's a priori guesses about where a program is spending significant time executing are frequently wrong for numerous reasons. First the programmer seldom has a comprehensive understanding of the complex dynamics of the hardware and software system. Secondly, the compiler itself often does not generate code that corresponds to the programmer's assumptions. It was accordingly highly desirable to provide a system for feeding back information to the programmer about the execution dynamics of a program in terms that the programmer could easily understand.

Thus various methods had been developed for monitoring aggregate CPU usage known as "profiling". One approach was to simply add instructions to the program being analyzed to enable it to essentially assess itself. This however introduces the undesirable characteristic of invasiveness wherein the possibility arose that necessary changes for profiling may introduce changes to the dynamics of the very thing one is attempting to measure. Yet another approach to providing for profiling was to develop external specialized hardware monitors. However, this approach also entailed numerous drawbacks, not the least of which was the expense associated with development of such specialized hardware and questions of feasibility in even doing so.

In some environments, the need for such profiling was particularly acute and yet was not satisfied by the existing methods due to the unique characteristics of the environments. An example of such an environment is the RISC System/6000 TM line of computers operating the AIX TM Operating System of the IBM Corporation (RISC/6000 and AIX are trademarks of the International Business Machines Corporation). A more detailed description of this hardware and software is provided in "IBM RISC System/6000 Technology", first edition 1990, publication SA23-2619, IBM Corporation.

One specific attempt at providing profiling for such environments was a system known in the art as "Gprof", described in the article "Gprof: A Call Graph Execution Profiler", Proc. ACM SIGPLAN Symposium on Compiler Construction, June, 1982, by S. L. Graham, P. B. Kessler, and M. K. McKusick. Several problems were associated with this profiling system. First there was no shared library support, thus requiring the compilation of program with exclusively non-shared libraries. The system did not provide support for the simultaneous profiling multiple processes, all processes which could be run had to be recompiled for routine-level profiling, the system was invasive (e.g. modified the executable code to be profiled), and required dedicating to profiling additional memory approximately half of the space of the program to be profiled. Moreover, in addition to the entire set of processes to be profiled having to be rebuilt in order to provide profiling, it was only capable of providing routine-level and no source statement or instruction level profiling, did not summarize all CPU usage but rather only that of one user program at a time, and further often required a substantial increase in user CPU time, sometimes approaching 300%, due to its invasiveness.

For this reason other approaches were suggested for profiling in such environments including, for example, the PIXIE system of MIPS Computer Systems, Inc. described in "Compilers Unlock RISC Secrets", ESD, December, 1989, pgs. 26–32, by Larry B. Weber.

In this system the executable objects of the processes to be profiled are analyzed and reconstructed with every atomic sequence of instructions, known in the art as a "basic block", being preceded with hooks which emit an event reporting the beginning of execution of the basic block from the emitted sequence of the basic block. From the emitted sequence of events the frequency of execution of each basic block can be maintained during run time. In a subject post processing step this frequency of occurrence is correlated to the source statement and routines of the program to provide execution time profiles.

Whereas this method offers the advantage of direct measurement over estimates obtained from sampling the program counter, it offers the disadvantages of no shared library support, no support of multiple processes, requires an increase in program executable space by up to factor of 3 and increase in program executables by factors of 10 or more.

Yet additional developments were made in profiling systems such as those outlined in the following references: "Non-Intrusive and Interactive Profiling in Parasight", Proc. ACM/SIGPLAN, August, 1988, pgs. 21–30, by Ziya Aral and Ilya Gertner. In this development, the invasiveness resulting in additional run time was decreased by selectively modifying code sequences of interest to directly measure the execution time of the selected code sequences and by employing an additional supplemental process to capture and process the run time measures.

From the foregoing it will be apparent that profiler technology to support the various aforementioned environments needed numerous improvements. Specifically, a profiler was needed which would support multiple process and multiple user environments, shared libraries (dynamically loaded shared objects), kernel as well as user execution spaces, and kernel extensions (dynamically loaded extensions to the kernel).

Requirements which became apparent as particularly desirable and greatly needed in a profiler related to the characteristics of convenience and non-invasiveness. These two factors are strongly related as well as having merit in their own right.

As an example of convenience, it was highly desirable to provide a profiling tool which would enable a user to very easily profile existing running code without requiring special procedures, recompilation, relinking, or rebuilding. Moreover, it was further highly desirable to provide a profiling tool which was non-invasive as well. The comprehensive feature simply would provide for profiling of all processes and all address domains for each process—the kernel, kernel extensions, user, and shared objects. The highly desirable feature of non-invasiveness would contemplate that executables and supporting environments would be virtually identical whether profiling or not, requiring no special effort in obtaining this equivalence. Conventional systems required modification of executables in order to profile at the instruction level, for example, resulting often in excessive CPU and memory utilization. The importance of non-invasiveness is that the gathered statistics are not distorted and all instruction streams and referenced addresses are maintained. The latter is particularly important when looking for performance issues that are related to overuse of hardware facilities such as the TLB, data and instruction caches, registers, and memory.

For all of the forgoing reasons, a profiling tool was highly desirable which could report on the aggregate CPU usage of all users of the environment, including all programs (processes) running, including the kernel, during execution of the user programs (as well as the fraction of time the CPU is idle) whereby users might determine CPU usage in a global sense. Such a profiler was further desired as a tool to investigate programs which might be CPU-bound wherein the programmer would find it useful to know sections of the program which were being most heavily used by the CPU. Still further a profiler was further highly sought which could be run using the executable program as is without the need to compile with special compiler flags or linker options whereby a subprogram profile could be obtained of any executable module that had already been built.

SUMMARY OF THE INVENTION

The invention disclosed herein is a system and method for comprehensive, non-invasive profiling of a processor whereby feedback is provided to a programmer of the execution dynamics of a program. In a preferred embodiment a partial real-time reduction is provided of selected trace events employing the environment's trace facility, and a post-processing function is then performed. A trace hook is provided in the environment's periodic clock routine which captures the address to be returned to following this timer's interrupt, and further captures the address of the caller of the routine represented by the first address.

The frequency of occurrences of the first address is collected and correlated to various virtual address spaces and corresponding subroutine offsets within those virtual address spaces. By employing the assembly and source code listing of programs, the address frequencies are then correlated back to specific instructions, and from information in the assembly listing accumulated time is further correlated against specific lines of source code. A profile is generated indicating the amount of time spent by the processor in various processes, kernel, shared library, and user spaces, and subroutines correlated to the lines of source code for negligible additional processor run time.

DETAILED DESCRIPTION OF THE PREFERRED EMBODIMENT

Figure 3A:
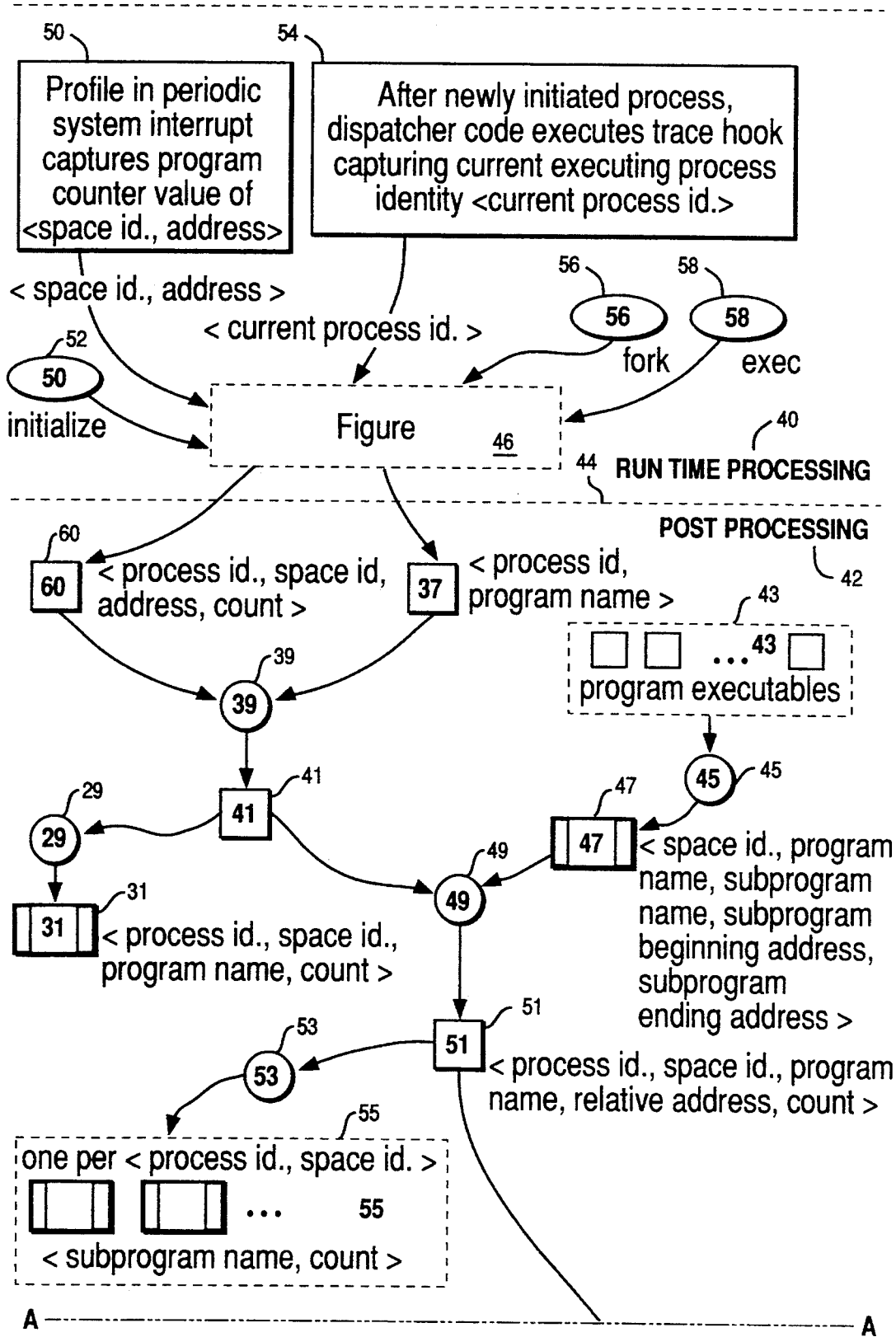
FIGS. 3A and 3B illustrate in sequence a flow diagram of the profiling process of the present invention.
Figure 3B:
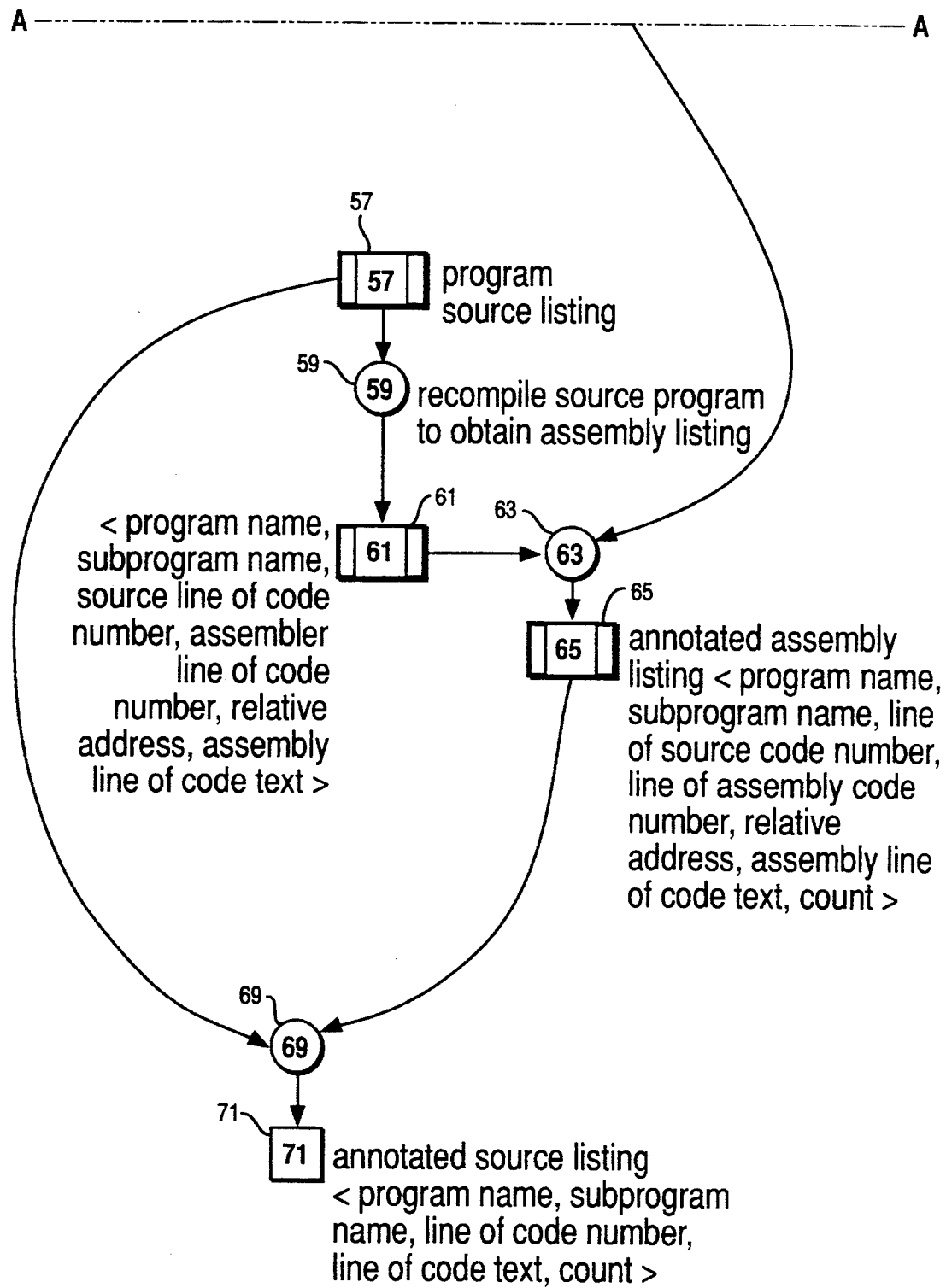
Figure 4:
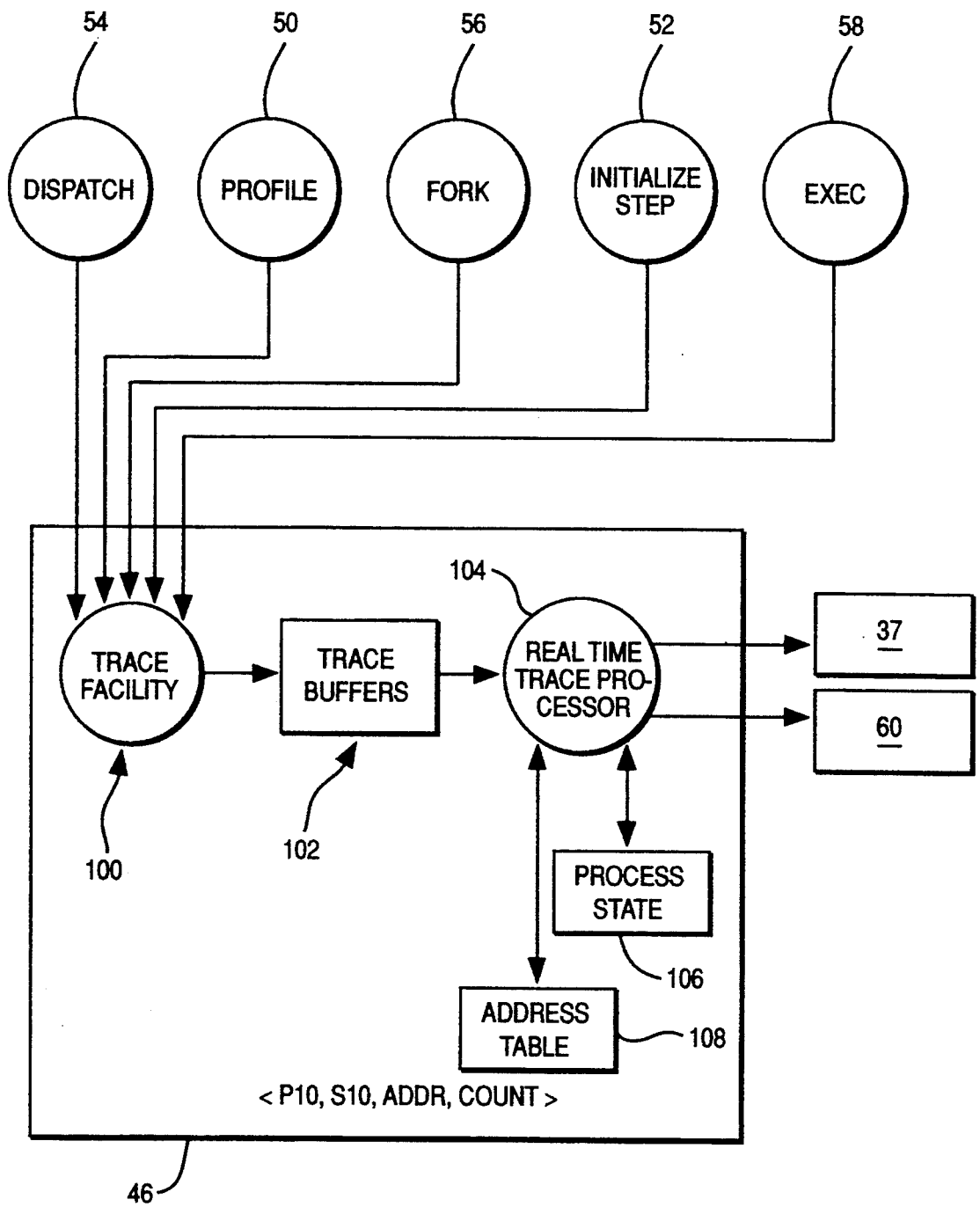
FIG. 4 is a functional block diagram illustrating the real-time profiler processing depicted in FIG. 3 in more detail.
Figure 5:
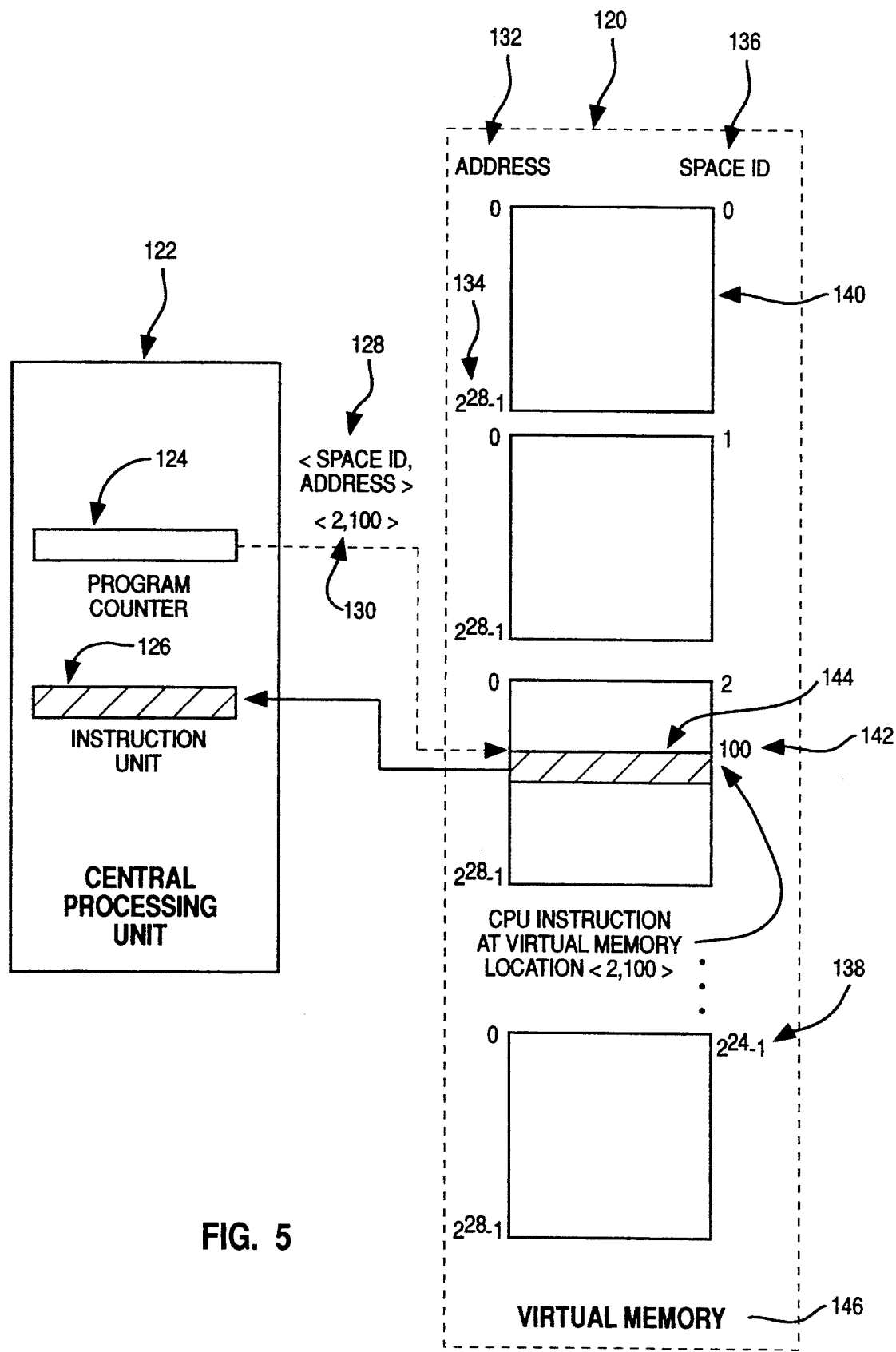
FIG. 5 is a block diagram of a representative computer system environment in which the profiling system and method of the present invention operates.

First a detailed description will be provided of the profiling process with reference to FIGS. 1-4, followed by a description of a representative computer environment suitable for such profiling with reference to FIG. 5. Regarding the description of the profiling process, first a high level description of the profiling output will be made with reference with FIGS. 1 and 2, followed by a detailed description of the operation of the invention with respect to the flow diagrams of FIGS. 3, 3A, 3B, and 4.

Figure 1:
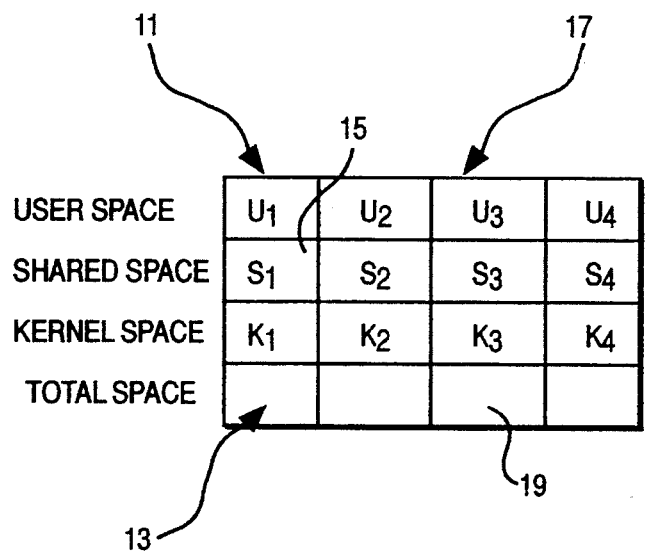
FIG. 1 is a schematic diagram illustrating the overall profile summary generated by the present invention.

Referring first to FIG. 1, depicted therein is a schematic representation of an overall profile summary generated by the present invention. Multiple columns such as column 11 correspond to various processes which may be executed by a multiprocess computational environment. For each such process, the profiler will generate a measure of total counts such as that appearing in location 13 which will correspond to the total counts collected from a periodic sampler which occur during execution of that particular process 11 and which are representative of the total CPU execution time in execution of that process.

It will be noted in FIG. 1 that for a given process or column such as column 11, the total counts 13 are further subdivided into those which occurred while the processor was executing in user, shared, or kernel memory address space (hereinafter referred to simply as "space"). A plurality of rows will be depicted in a representative profile labelled in FIG. 1 as "user", "shared", and "kernel". Thus with the foregoing in mind, a count appearing in box 15 for example would correspond to counts occurring while process 11 was executing in shared space, whereas the count total appearing in box 19 would correspond to those occurring while process 17 was executing in kernel, shared and user space.

Figure 2:
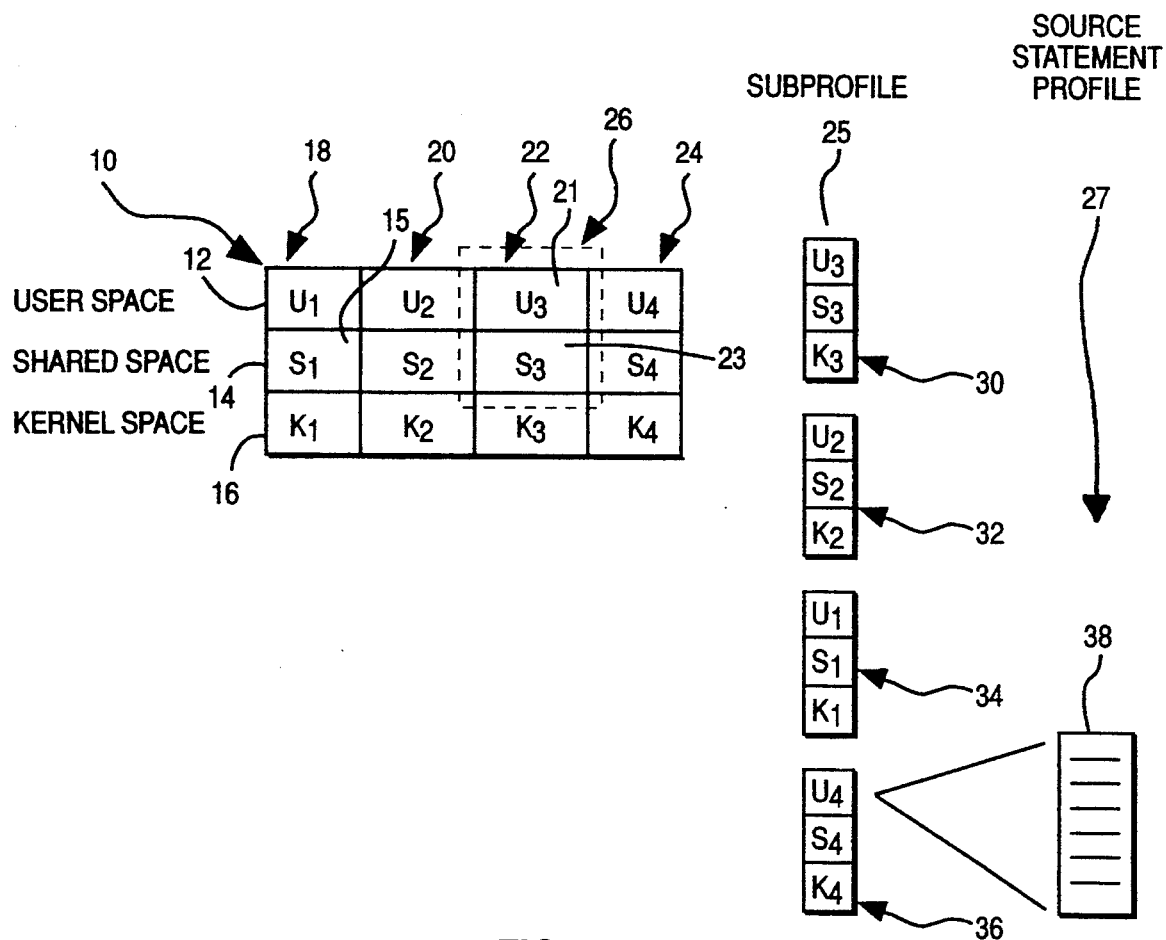
FIG. 2 is a schematic illustration depicting the relationship between a multiprocess, multispace computational environment and the profiling functions of the present invention.

Referring now to FIG. 2, this illustration is intended to depict a representative multiprocess, multispace, multiuser computational environment such as that suited for profiling in accordance with the teachings of the invention. It will be noted that hereinafter the term "profile" and "profiling" will be employed for brevity in lieu of "execution time profile report" and "execution time profiling", respectively.

The purpose of FIG. 2 is to illustrate the relationship between the multiprocess, multispace computational environment and the various capabilities of profiling provided by the subject invention. More particularly, the multiprocess and multispace environment is illustrated conceptually and generally by the rectangle 10. In like manner to that of FIG. 1, user space of a particular process such as process 18 is shown by the smaller rectangle 12. Similarly, for this same process 18, box 14 represents a shared space accessible by each user space. Finally with respect to representative process 18, box 16 is intended to depict the operating system kernel space which is accessible via system calls to each user space. Also in like manner to FIG. 1, reference numerals 20, 22, and 24 refer to correlative columns each corresponding to a different individual process, each such process having its own respective user, shared, and kernel space.

It will be noted in FIG. 2 that a rectangle 26 encompassing user and shared spaces 21 and 23 of a corresponding process 22 has been shown for purposes of discussion of prior art. In the prior art, such user and shared space 21 and 23 could be profiled to the subroutine level of detail. However, a separate and specific action must be taken by the individual desiring the profile for each and every such user or shared subroutine profile which was desired. In contrast, in accordance with the teachings of the present invention, the mechanism described herein captures all of the data required for generation of any desired subroutine profile without any particular prior action being required.

Still referring to FIG. 2, a subprofile column 25 is shown. A subprofile is an ordered listing of each subroutine within the given space. For each subroutine the total number of program counter samples that occurred within the address range of that subroutine is provided. The purpose of this is to schematically illustrate representative subroutine level execution-time profiles of the various spaces of the processes 18–24. Thus for example, profile 30 illustrates a profile of user, shared, and kernel space corresponding to process 22, subprofile 32 corresponds to a similar user, shared, and kernel space profile corresponding to process 20, subprofile 34 corresponds to a profile of the user, shared, and kernel spaces corresponding to process 18, and finally profile 36 corresponds to a profiling of user, shared, and kernel spaces associated with process 24.

For illustrative purposes now, attention will be focused on process 24 which corresponds, in accordance with FIG. 2, to spaces $U_4$, $S_4$, and $K_4$ (e.g. the user, shared, and kernel execution spaces of process 24.) By the mechanisms to be herein described, a complete execution time profile of process 24 may be produced, namely the previously mentioned profile 36 in all of its execution spaces. Still referring to FIG. 2, a column 27 captioned "source statement profile" is provided which is intended to schematically illustrate that in accordance with the invention, a source statement level profiling may be performed of the user space $U_4$, for example, of the process 24 shown subprofiled at reference numeral 36. This source statement level profile 38 means that each line of code in the source files of the user space of this process 24 (or any desired such process) will be annotated with the count representative of the CPU time spent executing the instructions generated for this line of code.

Referring now to. FIGS. 3A and 3B, a flow diagram is depicted illustrating a computerized process for generating the system profiles as herein described. Several conventions employing graphical elements have been utilized in the figure for convenience. First, a tuple of data elements is denoted therein by the notation <datum 1, datum 2, ... >. Next, an intermediate table of tuples or a file of tuples is denoted in FIG. 3 by a square. Thirdly, a report or program listing suitable for human viewing is represented by a rectangle. Next, an oval is employed to denote a system call or system interrupt which has been modified to produce supplemental data. Finally, the fifth graphical component employed in FIGS. 3A and 3B is a circle which denotes a processing step which produces an intermediate file, report, or table. The principal contents of each intermediate file, table, or report is denoted in FIGS. 3A and 3B by a tuple, representing a set of unique tuples of the type shown.

With continued reference to FIGS. 3A and 3B, it will be noted that the figure is conveniently divided into two areas separated by line 44 which are denoted as "run time processing" 40, and "post processing" 42. With respect to the run time processing 40 portion of FIG. 3, a block 46 is included which is intended to represent the additional detail provided in FIG. 4 to be hereinafter discussed.

Starting at the top of FIG. 3A in describing first the run time processing 40, an initialized step 52 produces a table of currently active processes consisting of process id and program name. This step is more fully described hereinafter with reference to FIG. 4. The data necessary to produce an intermediate file 37 is maintained during run time processing 40 by system processes fork 56 and exec 58. The fork 56 creates a new process id with the same name as the process which executed the fork. Exec 58 assigns a new name to a currently active process. As each new <process id, program name> tuple is created by either fork 56 or exec 58, it is retained in order to eventually produce the table 37.

By means of instrumentation placed in the system central processing unit dispatcher, the current process id is maintained. The AIX Operating System has a dispatcher software function. Following any interruption in sequence flow of running process, this dispatcher is invoked in order to start the appropriate process. This interruption might be due to 1) the running process blocking on an input/output request, 2) the termination of a CPU scheduling quantum, or 3) an external interrupt signal. At the time of dispatching a process, the dispatcher code 54 executes an AIX trace hook capturing the process id of the newly initiated process. Further, by means of instrumentation placed in the periodic system interrupt (profile 50 shown in run time processing component 40), the value of the program counter, denoted by the tuple <space id address> is captured. Further, by means of instrumentation placed in the system process dispatcher (profile 54 is shown in run time processing component 40), the current process id is maintained. Processing steps denoted in FIG. 4 combine the <current process id> and <space id, address> tuples and maintain the data necessary to produce the intermediate file 60, consisting of <process id, space id, address, count>. "Count" in the preceding tuple is the number of occurrences of <process id, space id, address> and denotes the number of times the program counter was sampled executing at "address" in "space id" for the process denoted by "process id". At the completion of the run time profiling interval 40, the intermediate files 60 and 37 shown in FIG. 3A are written.

Continuing to refer to FIG. 3A, and, more particularly, to the post processing 42 portion of the system and method of the invention, a processing step 39 will then merge together the intermediate table or files 60 and 37 in order to obtain the table 41 of <process id, space id, program name, address, count> tuples.

A report 31 is produced which sums the counts which are representative of the CPU time consumed in the system. Such a count is reported for each <process id, space id, and program name>. Report 31 is produced by processing step 29, which coalesces the tuples comprising the intermediate file 41 by summing together all counts associated with unique <process id, space id, program name> tuples over all address values encountered.

With continued reference to FIGS. 3A and 3B, next the processing steps will be described which are required to produce a set of reports 55 in which counts for every subprogram of a program are reported. The processing step 45 is employed to examine any program executables 43 selected for profiling and determines the address boundaries of subprogram elements within each executable. This step is accomplished by use of operating system utilities such as the "nm" command well known in the art in UNIX-based operating systems as well as by employing specialized programs written which postprocess the operating system state in order to resolve the address spaces of the dynamically loaded shared library and kernel extensions. These specialized programs access the memory area of the AIX operating system that contains the location of dynamically loaded modules.

Each such program executable has associated with it a program name and space id. For each subprogram in a program executable there exists a starting address and ending address. Processing step 45 examines executables to obtain for each executable the tuples <space id, program name, subprogram name, subprogram beginning address, subprogram ending address>, which form an intermediate file 47.

A processing step 49 is then performed which consists of appending to each tuple in the previously noted intermediate file 41 its corresponding subprogram name and relative address. The relative address is the displacement beyond a subprogram starting address, and is calculated from the program address from intermediate file 41 and the subprogram beginning address from intermediate file 47. The resulting intermediate file 51 consists of <process id, space id, program name, relative address, count> and is denoted at reference numeral 51.

A summary of reports 55 is produced in the process consisting of counts representing the amount of CPU time consumed by subprograms, and is produced for every <process id, space id, program name> tuple by processing step 53. This processing step 53 sums the counts for the tuples <process id, space id, program name, subprogram name, relative address, count> across all values of "relative address".

Next, the processing steps will be described which are required to obtain an annotated source code listing of programs selected for more detailed profiling in accordance with the invention. An annotated source code listing is a program source code listing in which the counts representative of the CPU time consumed by execution of the machine instructions generated by each line of source code is reported. As an intermediate step, an annotated assembly code listing for each program selected for more detailed profiling is first constructed. As shown in FIG. 3, a processing step 59 is performed which is a compilation of a program source listing 57 in order to obtain assembly code listings 61 of the program. A source code listing of a program is represented by the tuples <program name, subprogram name, source line of code number, source line of code text>. The assembly code listing is represented by the tuples <program name, subprogram name, source line of code number, assembly line of code number, relative address, assembly line of code text>.

For tuples of intermediate file 61 which match the tuples of intermediate file 51 for the elements <program name, subprogram name, relative address>, processing step 63 appends the data <line of source code number, count> to form an annotated assembly listing consisting of <program name, subprogram name, line of source code number, line of assembler code number, relative address, assembler line of code text, count> which comprises report 65. An annotated source code listing is obtained from step 69 by summing all counts in intermediate file 65 corresponding to the identical <program name, line of source code number> and appending the sum to the source listing of the program 57. The annotated source listing 71 consists of the tuples <program name, subprogram name, line of code number, line of code text, count>.

Referring now to FIG. 4, depicted therein is a more detailed illustration of the steps employed in generating the real-time portion of the profiling of the present invention. The procedure 104 begins when a user invokes the profiler and specifies the profiling measurement interval. This processing step in turn invokes the trace facility process 100 of the operating system. When the trace facility process 100 is turned on, a specific subset of all the AIX trace facility hooks are activated. These hooks result in a corresponding set of events to be captured. Hereinafter the same reference numeral will be utilized to refer to both a hook and the trace event resulting from the enabling of that hook. Calls or interrupts referred to as profile 50, dispatch 54, fork 56, initialize 52, and exec 58 are specified by the trace facility process 100.

The initialization step 52 captures the process name and PID of all active processes. These values are put into table 106 of FIG. 4. These initial values are obtained by use of the AIX "ps" command.

After the trace facility process 100 has been activated, the real-time trace processor processing step 104 goes into a wait condition. Trace facility processing step 100 then collects trace hooks into its trace buffer 102 as they occur. The trace buffer is preferably configured into two buffers. When the first buffer is full, subsequent events are put into the second buffer and the trace facility, using standard operating system facilities well known in the art, reactivates the real-time trace processor processing step 104 which then proceeds to process the contents of the trace buffer 102.

This processing consists of stepping through the sequential trace events stored in the trace buffer 102 and for each event type performing the appropriate action, as described below.

The initialize step 52 uses the ps command to record a PID, process name tuple for each process that is active when the trace facility 100 is first turned on. The exec hook 58 contains a new process name. This hook causes the creation of a new entry in 106 consisting of current PID and the new process name from the exec hook. The fork hook 56 contains the PID of a newly created process. This hook causes an addition to 106 of a tuple consisting of the new PID and the current process name.

The dispatch hook 54 contains the PID of the newly dispatched process. The profile hook 50 contains the tuple of SID and relative address within that space. The processing of this hook is important in supporting the function of maintaining all the information necessary to profile all processes and all spaces within a reasonable amount of memory space. The technique used is one well known in the art referred to as a hash table. The key to the table is a function of PID, (current process id) and SID and address from the profile hook 150. When a hash slot is found where the key is matched (PID, SID, and address), the associated count field of 108 is incremented. This processing continues throughout the real-time phase of the profiling. When the profiles process terminates the real-time trace processor function 104 deactivates the trace facility process 100 which causes the remaining trace buffer contents to be transferred to 104 for processing. When the latter function is completed, the tables 106 and 108 are then written to files 37 and 60 (FIG. 3), respectively, for post processing as previously described.

Referring to FIG. 5, there is depicted therein a representative computer system suitable for the profiling system hereinbefore disclosed. A central processing unit 122 is provided which includes a program counter 124 which will contain an address 132 of the form shown at reference numeral 128. An address is defined in the virtual memory 120 as being a space identifier 136, followed by a displacement address within that space identifier. For example, space identifier 2 and displacement address 100 shown at reference numeral 130 point to the third space identifier block of contiguous virtual memory, and the instruction word that relative address 100 shown at reference numeral 144 within that block 142.

In a particular embodiment of an environment suitable for profiling ill accordance with the invention such as the RISC System/6000 of the IBM Corporation, the virtual memory 146 shown more generally at reference numeral 138 is comprised of $2^{24}-1$ identical contiguous blocks of memory where space id 136 refers to the index $2^{24}-1$ as indicated at reference numeral 138. The displacement address 132 ranges from 0 to $2^{28}-1$ shown at reference numeral 134, yielding $2^{28}$ contiguous elements of memory within the memory system of FIG. 5. For purposes of illustration, the space id, address tuple 130 defines the contents of the space id=2 and displacement address=100 represented by the previously noted memory word 144. The purpose of the program counter 124 is to step through the instructions in a computer program and the contents of the program counter 124 are the space id and relative address of the particular memory word such as word 144. For every value of the program counter 124 the contents of the memory word, are automatically copied into the instruction unit 126 which comprises a second component of the central processing unit 122 for execution.

While the invention has been shown and described with reference to particular embodiments thereof, it will be understood by those skilled in the art that the foregoing and other changes in form and details may be made therein without departing from the spirit and scope of the invention.

What is claimed is:

1. In a computer system having an operating system kernel in a program executing multiple processes, a method for use during execution of said multiple processes in profiling said multiple processes, comprising:
    inserting with said system a trace hook mechanism in a periodic clock routine of said operating system kernel;
    inserting with said system additional trace hook mechanisms in said operating system kernel sufficient to initialize and maintain process identity, name, and current running process correspondences;
    generating with said system trace events in response to said trace hook and additional trace hook mechanisms at predetermined time intervals;
    generating with said system trace events in response to changes in process state at times of occurrence of said changes in process state;
    creating and maintaining with said system during said profiling a trace buffer as a function of said trace events comprised of:
        a plurality of fields of program counter hook data, each corresponding to a different <current executing process identity, program counter value> tuple and a count of the number of repetitions of each said instance; and
        a plurality of fields maintaining correspondences between process names,
    identities, and said fields of program counter hook data.

2. The method of claim 1 further comprising in a postprocessing interval the steps of:
    generating with said system correlations of program counter frequency counts to a plurality of programming constructs.

3. The method of claim 2 wherein said constructs comprise at least one from a group of:
    process;
    space identity;
    routine;
    source line of code; and
    assembly instruction.

* * * * *